United States Patent
Hikichi et al.

(10) Patent No.: US 7,206,115 B2
(45) Date of Patent: Apr. 17, 2007

(54) OPTICAL SWITCHING ELEMENT, AND DEVICE, OPTICALLY ADDRESSED TYPE DISPLAY MEDIUM AND DISPLAY EACH USING THE OPTICAL SWITCHING ELEMENT

(75) Inventors: Takehito Hikichi, Ebina (JP); Hideo Kobayashi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 294 days.

(21) Appl. No.: 10/740,852

(22) Filed: Dec. 22, 2003

(65) Prior Publication Data
US 2004/0263700 A1   Dec. 30, 2004

(30) Foreign Application Priority Data
Jun. 26, 2003 (JP) ............................. 2003-182813

(51) Int. Cl.
*G02F 1/15* (2006.01)
(52) U.S. Cl. .................. 359/252; 359/254; 359/265; 359/296; 430/57.2
(58) Field of Classification Search ............. 359/244, 359/252, 254, 265, 273, 296; 430/57.2; 349/2, 349/25
See application file for complete search history.

(56) References Cited

U.S. PATENT DOCUMENTS

| | | | |
|---|---|---|---|
| 4,450,219 A * | 5/1984 | Horie et al. ............. 430/58.4 |
| 5,292,603 A * | 3/1994 | Sakai et al. ............. 430/18 |
| 6,031,655 A * | 2/2000 | Yagyu ..................... 359/292 |
| 6,233,027 B1 * | 5/2001 | Unno et al. ............. 349/25 |
| 6,280,884 B1 * | 8/2001 | Bjorklund et al. ...... 430/1 |
| 6,406,823 B2 * | 6/2002 | Melnyk et al. ......... 430/46 |
| 2004/0242841 A1 * | 12/2004 | Cammack et al. .... 528/481 |

FOREIGN PATENT DOCUMENTS

JP    A 2000-180888    6/2000

* cited by examiner

Primary Examiner—Hung Xuan Dang
Assistant Examiner—Joseph Martinez
(74) Attorney, Agent, or Firm—Oliff & Berridge, PLC

(57) ABSTRACT

The invention provides an optical switching element and a device, an optically addressed type display medium and a display each including such an optical switching element. The optical switching element comprising an optical switching layer including lower and upper charge generating layers and a charge transporting layer sandwiched therebetween, wherein the optical switching element has at least one of the following characteristics. (1) In the charge transporting layer, a charge transporting material to binder polymer ratio calculated according to the formula: [charge transporting material/(charge transporting material+binder polymer)]× 100 (% by weight) is 50% by weight or more; (2) a polymer compound is used as the charge transporting material; and (3) the charge generating layer on the light incident side (the lower charge generating layer) has a lower light absorptance than that of the other charge generating layer (the upper charge generating layer).

5 Claims, 3 Drawing Sheets

OPTICAL SWITCHING ELEMENT, AND DEVICE, OPTICALLY ADDRESSED TYPE DISPLAY MEDIUM AND DISPLAY EACH USING THE OPTICAL SWITCHING ELEMENT

CROSS-REFERENCE TO RELATED APPLICATIONS

This application claims benefit of and priority to Japanese Patent Application No. 2003-182813, filed on Jun. 26, 2003, which is incorporated herein by reference in its entirety for all purposes.

BACKGROUND OF THE INVENTION

1. Field of the Invention

The present invention relates to an optical switching element and to a device, an optically addressed type display medium and a display that are the optical switching element.

2. Description of the Related Art

In recent years, optically addressed spatial modulating devices, in which a photoconductive switching element and a display element are combined, have been developed. Such devices are being utilized as light bulbs for projectors or the like and are being investigated for potential uses in the field of optical information processing as disclosed in "*Liquid Crystal Spatial Modulators and Information Processing*", (Liquid Crystal), Vol. 2, No. 1, 1998, pp. 3–18.

In the optically addressed spatial modulating device, the display element is driven to form a display image by causing the impedance of the photoconductive switching element to change depending on the amount of received light, and controlling a voltage applied to the display element, while applying a specific voltage to the element.

In particular, a medium, which writes by applying a voltage to a laminated optical photoconductive switching element and a display element having a memory function, while radiating an optical image, is being paid attention as an electronic paper medium, the medium of which can be separated from the writing device and carried.

Examples of display elements that have been investigated for such an optically addressed type medium include a liquid crystal display element such as that using a cholesteric liquid crystal or a ferroelectric liquid crystal, an electrophoretic element, an electrorotation element, a toner electrotransfer element, and an element in which any of these elements is encapsulated.

Examples of optical switching elements that have been investigated as optical switching element that can control voltage or current depending on the amount of received light include amorphous silicon elements that have been used in the field of electrophotography, OPC elements that have a function separation type double-layer structure with an organic photoconductor, and OPC elements that have a structure that includes a charge transporting layer (CTL) and charge generating layers (CGLs) provided on both sides of the CTL (hereinafter referred to as a dual CGL structure). In particular, the OPC element has the advantages of being able to be formed on a flexible substrate such as a PET film because it can be produced without heat treatment at high temperature, and able to be manufactured at low cost because it can be produced without a vacuum process. The dual CGL structure is particularly advantageous because it can be driven by alternating current and because, is used in combination with a liquid crystal element as the display element, an image is not burned into the display. Such a burn-in is caused by ion transfer by the bias component included in the applied voltage. The carrier used for driving may be positive or negative.

The OPC element with the dual CGL structure allows the display layer to be driven by alternating current, so that image sticking can be prevented, which would otherwise be caused by segregation of ions or the like. Therefore, high reliability can be achieved. As a result of analysis, however, it has been found that in a conventional charge transporting layer (CTL) comprising an charge transporting material (CTM) and a binder polymer in a ratio of 40:60, the CTM concentration is unevenly distributed in the thickness direction of the CTL and that there is a low CTM content layer (a CTM-poor layer) particularly in the vicinity of the surface of the known CTL.

This can cause the following problems. The charge-injection efficiency under the application of positive electric field to the CGL in the upper portion of the CTL can differ from that under the application of negative electric field. Therefore, the amount of the charge flowing under light conditions can vary, so that the electrical characteristics of the OPC element can be asymmetrical at the time of OPC illumination. Such a state can accumulate in the display layer causing a drift of the applied voltage and a degradation in the display characteristics. Moreover, the thickness of the CTM-poor layer increases with that of the CTL. Therefore, if the CTL is thick, the degree of the asymmetry can be high and the degradation in the display characteristics can be significant. Therefore, there are difficulties in increasing the thickness of the CTL, and the design of the balance with the impedance of the display layer is restricted. Thus, the OPC element cannot offer sufficient driving performance; the display characteristics are degraded; and the driving voltage margin is narrow.

Thus, the invention is provided to solve the above problems with the prior art and to achieve the following object. It is an object of the invention to provide an optical switching element having a dual CGL structure in which asymmetry of the electrical characteristics is suppressed so that the display characteristics or the driving performance can be improved, and to provide a device, an optically addressed type display medium and a display each using such an optical switching element.

SUMMARY OF THE INVENTION

The above problems can be solved by the present invention as described below.

The invention is directed to an optical switching element comprising an optical switching layer that includes a pair of charge generating layers and a charge transporting layer sandwiched therebetween, wherein the optical switching element has at least one of the following characteristics:

(1) the charge transporting layer includes a charge transporting material and a binder polymer, wherein a charge transporting material to binder polymer ratio calculated according to the formula: {charge transporting material/(charge transporting material+binder polymer)}×100 is at least 50% by weight; or (2) the charge transporting layer includes a charge transporting material selected from charge transporting macromolecular materials; or (3) the pair of the charge generating layers include a first charge generating layer on an incident light side of the optical switching layer and a second charge generating layer on the other side of the optical switching layer, wherein the first charge generating layer has a lower light absorptance than that of the second charge generating layer.

In a first embodiment of the invention, the optical switching element has the characteristic (1).

In the first embodiment of the invention, a dual CGL structure of the optical switching element is wherein the charge transporting material to binder polymer ratio calculated according to the formula: [charge transporting material/(charge transporting material+binder polymer)]×100 (% by weight) is at least 50% by weight, preferably at least 60% by weight. In such a charge transporting material-rich structure, a bias can hardly be created in the concentration of the charge transporting material. Therefore, asymmetry of the electrical characteristics can be inhibited, and the display characteristics or the driving performance can be improved.

In the optical switching element according to the first embodiment of the invention, the charge transporting material is preferably selected from benzidine charge transporting materials. The benzidine charge transporting materials can hardly cause a concentration bias and have low ionization potential (Ip), which is closer to the ionization potential of the charge generating material (CGM) than that of other materials. Therefore, the benzidine materials are advantageous in terms of sensitivity or in terms of providing low resistance.

In a second embodiment of the invention, the optical switching element has the characteristic (2).

In the second embodiment of the invention, the charge transporting layer is made of a macromolecular compound (a charge transporting macromolecular material). Such a charge transporting layer can be free of any binder polymer (binder resin), or even if the binder polymer is used, the amount of it can be small. Thus, a concentration bias can be prevented in the charge transporting layer, asymmetry of the electrical characteristics can be suppressed, and a display characteristics and a driving performance thereof can be improved.

In the optical switching element according to the second embodiment of the invention, the charge transporting material is preferably selected from benzidine charge transporting macromolecular materials. Similarly to the above, the benzidine charge transporting macromolecular materials can be compatible with the charge generating material in terms of ionization potential and can be advantageous in terms of sensitivity or in terms of providing low resistance.

In a third embodiment of the invention, the optical switching element has the characteristic (3).

If the pair of the charge generating layers significantly differ in quantity of light absorption under actual driving conditions, both layers can differ in charge injection efficiency so that the quantity of the charge flowing under light conditions can vary and that asymmetry of the electrical characteristics can be high.

In the third embodiment of the invention, the pair of the charge generating layers include a first charge generating layer on an incident light side thereof and a second charge generating layer on the other side thereof, and the first charge generating layer has a lower light absorptance than that of the second charge generating layer. In such a structure, the quantity of light absorbed into the first charge generating layer can be close to that absorbed into the second charge generating layer under actual driving conditions.

In a more preferred manner, the first charge generating layer and the second charge generating each absorb substantially the same quantity of light, so that asymmetry of the electrical characteristics can be suppressed more effectively.

The invention is also directed to a device, comprising: the optical switching element according to any of the first to third embodiment of the invention; and a functional element electrically connected to the optical switching element.

The invention is also directed to an optically addressed type display medium, comprising: a pair of electrodes, at least one of which has an optical transparency; the optical switching element according to any of the first to third embodiment of the invention; and a display element comprising a display layer with a memory function, wherein the optical switching element and the display element are layered between the pair of electrodes.

The invention is also directed to a display device, comprising: the inventive optically addressed type display medium; means for driving the display medium; and means for performing optical writing to the display medium.

DETAILED DESCRIPTION OF THE INVENTION

Figure 1:
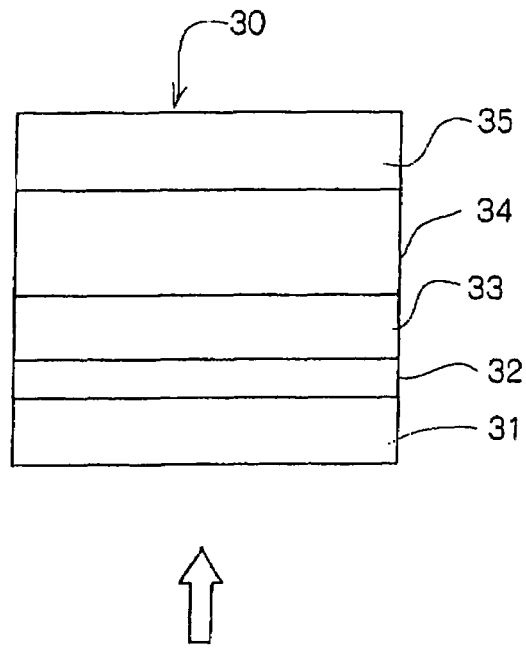
FIG. 1 is a schematic diagram showing a structure of the present inventive optical switching element.

Referring to the drawings, the present invention is described in detail below. In all the drawings, the elements having substantially the same function are represented by the same reference letter.

Optical Switching Element

Referring to FIG. 1, the inventive optical switching element is described below. An optical switching element 30 (a dual CGL structured optical switching element) as shown in FIG. 1 includes a substrate 31 provided with an electrode 32 (an electrically conductive film) and an optical switching layer (a photoconductive layer) comprising a lower charge generating layer 33 (a first charge generating layer), a charge transporting layer 34 and an upper charge generating layer 35 (a second charge generating layer) which are stacked in order on the substrate 31, wherein the charge transporting layer is sandwiched between the pair of the charge generating layers. In the device or the optically addressed type display medium as described below, the upper charge generating layer 35 is located on a function layer side such as a display layer side. In the drawing, the arrow represents the direction of incident light (but the direction of incident light is not limited to the drawn direction).

The charge transporting layer 34 comprises a charge transporting material and a binder resin (a binder polymer). In the thickness direction of the charge transporting layer 34, unevenness of the CTM concentration should be reduced, and the CTM-poor layer should be prevented. In order to do so, the charge transporting material to binder polymer ratio calculated according to the formula: [charge transporting material/(charge transporting material+binder polymer)]×100 (% by weight) is set at least 50% by weight, preferably at least 60% by weight, more preferably in a range from 60% by weight to 80% by weight. A ratio more than 80% by weight is not preferred, because in such a case, the amount of the binder resin can be insufficient so that the strength of the film can be significantly reduced.

Examples of the charge transporting material as a hole transporting material include trinitrofluorene compounds, polyvinylcarbazole compounds, oxadiazole compounds, hydrazone compounds such as benzylamino hydrazone compounds and quinoline-based hydrazone compounds, stilbene compounds, triphenylamine compounds, triphenylmethane compounds, and benzidine compounds. Applicable examples of the electron transporting material include quinone compounds, tetracyanoquino dimethane compounds, fluorene compounds, xanthone compounds, and benzophenone compounds.

porting macromolecular material. In such a case, the charge transporting layer 34 can be free of any binder polymer (binder resin), or even if the binder polymer is used, the amount of it can be small. Thus, the concentration bias can be prevented in the charge transporting layer 34; asymmetry of the electrical characteristics can be suppressed; and the display characteristics and the driving performance can be improved.

Examples of the charge transporting macromolecular material include a new charge transporting polymer represented by Structural Formula (I-1) below and another new charge transporting polymer represented by Structural Formula (I-2) below. These charge transporting polymers are preferred, because they have good charge transporting properties and good mechanical wear resistance.

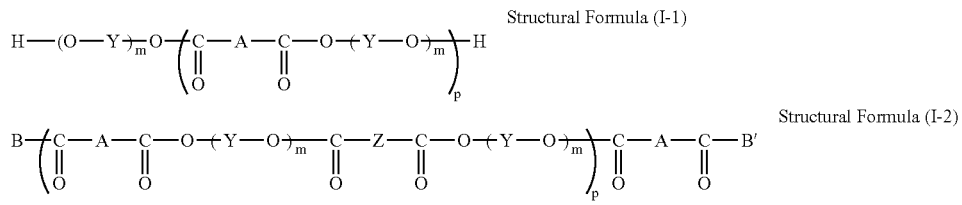

Structural Formula (I-1)

Structural Formula (I-2)

In a preferred manner, the charge transporting material comprises a benzidine compound and/or a triphenylamine compound as a main component. Useful examples of the charge transporting material include hydrazone compounds, styryl triphenylamine compounds, N,N,N',N'-tetraphenylbenzidine compounds, and triphenylamine compounds.

Among these charge transporting materials, the triphenylamine compounds and particularly the benzidine compounds are advantageous in terms of sensitivity or in terms of providing low resistance, because they have low ionization potential (Ip), which is closer to the ionization potential (Ip) of the CGM than that of other materials, and have high compatibility with the binder polymer (binder resin) and therefore can hardly cause concentration bias.

Specific examples of such preferred compounds include at least one benzidine compound selected from the group consisting of N,N'-bis(3-methylphenyl)-N,N'-diphenyl-(1,1'-biphenyl)-4,4'-diamine, N,N'-bis(3-ethylphenyl)-N,N'-diphenyl-(1,1'-biphenyl)-4,4'-diamine, and N,N'-bis(3-ethylphenyl)-N,N'-bis(3-methylphenyl)-(1,1'-biphenyl)-4,4'-diamine; and a triphenylamine compound, N,N-bis(3,4-dimethylphenyl)bisphenyl-4-amine.

Examples of the binder polymer (binder resin) include polycarbonate, polyallylate, polyester, polystyrene, a styrene-acrylonitrile copolymer, polysulfone, polymethacrylate, and a styrene-methacrylate ester copolymer.

Examples of the solvent for use in the coating liquid for forming the charge transporting layer 34 include aromatic hydrocarbons such as benzene, toluene, xylene, and monochlorobenzen; cyclic or straight chain ethers such as tetrahydrofuran and ethyl ether; ketones such as acetone and 2-butanone; and halogenated aliphatic hydrocarbons such as methylene chloride, chloroform and ethylene chloride.

As describe above, the charge transporting layer 34 may comprise a low molecular weight charge transporting material and a binder resin (binder polymer). Alternatively, the charge transporting layer 34 may comprise a charge transwherein Y represents a bivalent hydrocarbon group; Z represents a bivalent hydrocarbon group; A represents a group represented by the following formula:

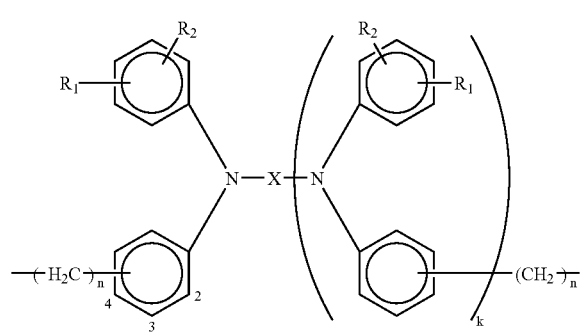

wherein $R_1$ and $R_2$ each independently represent a hydrogen atom, an alkyl group, an alkoxy group, a substituted amino group, or a halogen atom; X represents a substituted or unsubstituted bivalent aromatic group; n represents an integer of 1 to 5; and k represents 0 or 1, B and B' each independently represent $—O—(Y—O)_m—H$ or $—O—(Y—O)_m—CO-Z-CO—OR'$, wherein R' represents a hydrogen atom, an alkyl group, a substituted or unsubstituted aryl group, or a substituted or unsubstituted aralkyl group; Y represents a bivalent hydrocarbon group; Z represents a bivalent hydrocarbon group; and m represents an integer of 1 to 5, m represents an integer of 1 to 5; and p represents an integer of 5 to 5000.

Examples of X, Y or Z in General Formula (I-1) or (I-2) include the groups as shown below. X is may be selected from the group consisting of the following groups (1) to (7):

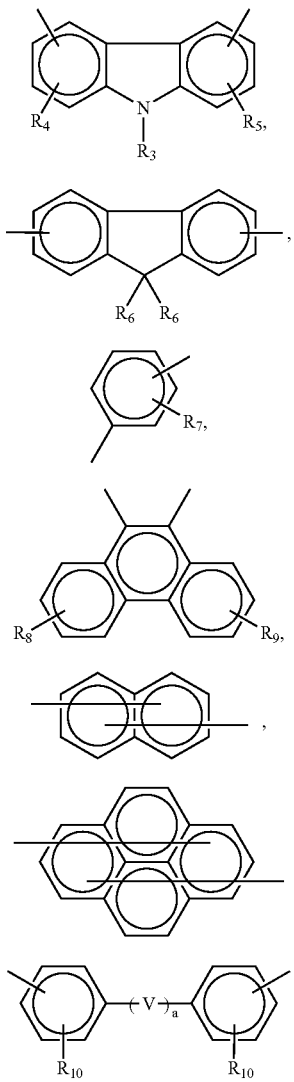

wherein $R_3$ represents a hydrogen atom, an alkyl group having 1 to 4 carbon atoms, a substituted or unsubstituted phenyl group, or a substituted or unsubstituted aralkyl group; $R_4$ to $R_{10}$ each represent a hydrogen atom, an alkyl group having 1 to 4 carbon atoms, an alkoxy group having 1 to 4 carbon atoms, a substituted or unsubstituted phenyl group, a substituted or unsubstituted aralkyl group, or a halogen atom; a represents 0 or 1; and V represents a group selected from the group consisting of groups (8) to (17) below, wherein b represents an integer of 1 to 10; and c represents an integer of 1 to 3.

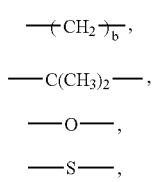

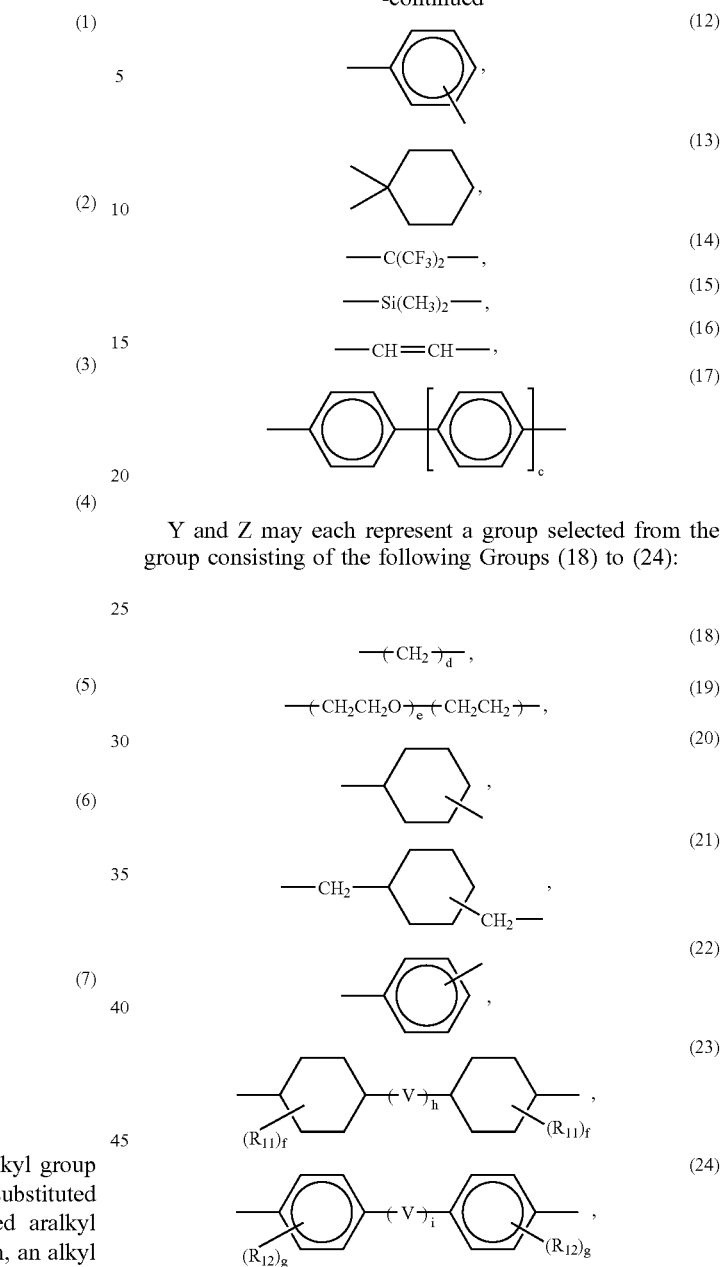

Y and Z may each represent a group selected from the group consisting of the following Groups (18) to (24):

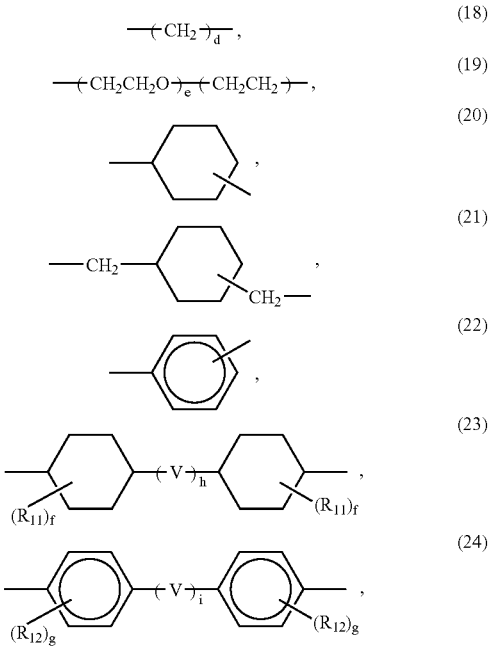

wherein $R_{11}$ and $R_{12}$ each represent a hydrogen atom, an alkyl group having 1 to 4 carbon atoms, an alkoxy group having 1 to 4 carbon atoms, a substituted or unsubstituted phenyl group, a substituted or unsubstituted aralkyl group, or a halogen atom; d and e each represent an integer of 1 to 10; f and g each represent an integer of 0, 1 or 2; h and i each represent 0 or 1; and V has the same meaning as defined above.

The charge transporting polymer may have a polymerization degree (p) of 5 to 5000, preferably in the range of from 10 to 1000. The weight average molecular weight (Mw) thereof is preferably in the range of from 10000 to 300000. Specific examples of the charge transporting polymer according to the invention include but are not limited to the compounds as shown in Tables 1 to 10. Of these polymers, the polymers having a biphenyl structure represented by Structural Formula (II) or (III) below as the X group are particularly preferred, because of high mobility as reported in *The Sixth International Congress on Advances in Non-Impact Printing Technologies,* 306, 1990.

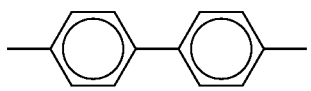

(II)

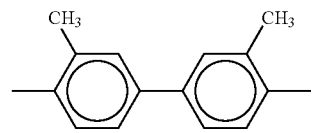

(III)

Examples of the charge transporting polymer are shown below, but such examples are not intended to limit the scope of the invention. In the following tables 1–10, "Cpd." means a compound number, and "CP." means a coupling position.

TABLE 1

| Cpd. | X | Y | Z | $R_1$ | $R_2$ | CP. | k | m | n | p |
|---|---|---|---|---|---|---|---|---|---|---|
| 1 | (methylphenyl) | —CH$_2$CH$_2$— | — | 3-CH$_3$ | 4-CH$_3$ | 3 | 0 | 1 | 2 | 240 |
| 2 | (phenyl) | —CH$_2$CH$_2$— | — | H | H | 4 | 0 | 1 | 2 | 250 |
| 3 | (biphenyl) | —CH$_2$CH$_2$— | — | H | H | 2 | 1 | 1 | 2 | 150 |
| 4 | (biphenyl) | —CH$_2$CH$_2$— | — | H | H | 3 | 1 | 1 | 2 | 170 |
| 5 | (biphenyl) | —CH$_2$CH$_2$— | — | H | H | 4 | 1 | 1 | 2 | 185 |
| 6 | (biphenyl) | —CH$_2$CH$_3$— | — | H | H | 4 | 1 | 1 | 1 | 200 |
| 7 | (biphenyl) | —CH$_2$CH$_2$— | — | H | H | 4 | 1 | 2 | 2 | 55 |
| 8 | (biphenyl) | —CH$_2$CH$_2$— | (phenyl) | H | H | 3 | 1 | 1 | 2 | 35 |
| 9 | (biphenyl) | —CH$_2$CH$_2$— | (phenyl) | H | H | 3 | 1 | 2 | 2 | 40 |
| 10 | (biphenyl) | —CH$_2$CH$_2$— | (phenyl) | H | H | 3 | 1 | 1 | 4 | 35 |
| 11 | (biphenyl) | —CH$_2$CH$_2$— | (methylphenyl) | H | H | 3 | 1 | 1 | 2 | 20 |

TABLE 1-continued
| Cpd. | X | Y | Z | R₁ | R₂ | CP. | k | m | n | p |
|---|---|---|---|---|---|---|---|---|---|---|
| 12 | 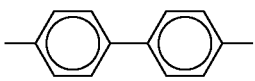 | 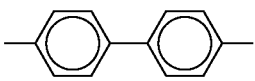 | 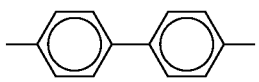 | H | H | 3 | 1 | 1 | 2 | 20 |
TABLE 2
| Cpd. | X | Y | Z | R₁ | R₂ | CP. | k | m | n | p |
|---|---|---|---|---|---|---|---|---|---|---|
| 13 | 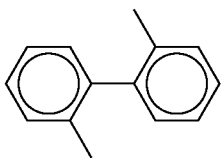 | —CH₂CH₂— | 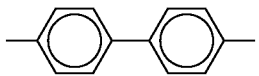 | H | H | 3 | 1 | 1 | 2 | 15 |
| 14 | 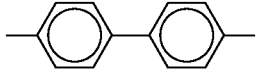 | —(CH₂)₄— | —(CH₂)₄— | 4-CH₃ | H | 3 | 0 | 1 | 2 | 30 |
| 15 | 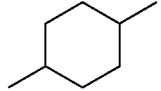 | 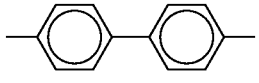 | — | H | H | 3 | 1 | 1 | 2 | 35 |
| 16 | 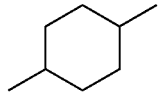 |  | 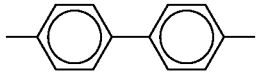 | H | H | 3 | 1 | 1 | 2 | 20 |
| 17 | 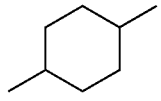 | 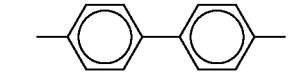 | 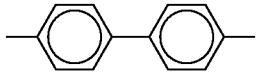 | H | H | 3 | 1 | 1 | 2 | 20 |
| 18 | 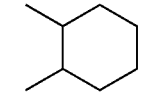 | 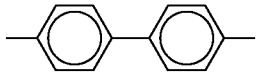 | —(CH₂)₄— | H | H | 3 | 1 | 1 | 2 | 15 |
| 19 | 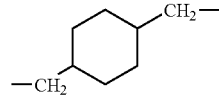 | 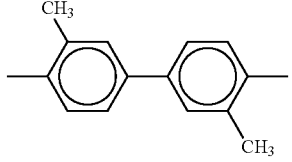 | — | H | H | 3 | 1 | 1 | 2 | 30 |
| 20 | 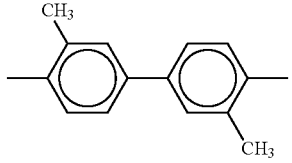 | —CH₂CH₂— | — | H | H | 3 | 1 | 1 | 2 | 180 |
| 21 |  | —CH₂CH₂— |  | H | H | 3 | 1 | 1 | 2 | 25 |

TABLE 2-continued

| Cpd. | X | Y | Z | R₁ | R₂ | CP. | k | m | n | p |
|---|---|---|---|---|---|---|---|---|---|---|
| 22 | 3,4-dimethyl-3'-methyl-biphenyl | 1,4-cyclohexyl | — | H | H | 3 | 1 | 1 | 2 | 30 |

TABLE 3

| Cpd. | X | Y | Z | R₁ | R₂ | CP. | k | m | n | p |
|---|---|---|---|---|---|---|---|---|---|---|
| 23 | 3,4-dimethyl-3'-methyl-biphenyl | 1,2-cyclohexyl | — | H | H | 3 | 1 | 1 | 2 | 25 |
| 24 | 3,4-dimethyl-3'-methyl-biphenyl | —CH₂-cyclohexyl-CH₂— | biphenyl | H | H | 3 | 1 | 1 | 2 | 25 |
| 25 | 3,4-dimethyl-3'-methyl-biphenyl | —CH₂CH₂— | — | 2-CH₃ | H | 3 | 1 | 1 | 2 | 190 |
| 26 | 3,4-dimethyl-3'-methyl-biphenyl | —CH₂CH₂— | phenyl | 3-CH₃ | H | 3 | 1 | 1 | 2 | 25 |
| 27 | 3,4-dimethyl-3'-methyl-biphenyl | 1,4-cyclohexyl | — | 4-CH₃ | H | 3 | 1 | 1 | 2 | 35 |
| 28 | 3,4-dimethyl-3'-methyl-biphenyl | 1,2-cyclohexyl | — | 3-CH₃ | 4-CH₃ | 3 | 1 | 1 | 2 | 30 |
| 29 | 3,4-dimethyl-3'-methyl-biphenyl | —CH₂-cyclohexyl-CH₂— | biphenyl | 3-CH₃ | 5-CH₃ | 3 | 1 | 1 | 2 | 25 |

TABLE 4

| Cpd. | X | Y | Z | R₁ | R₂ | CP. | k | m | n | p |
|------|---|---|---|----|----|-----|---|---|---|---|
| 30 | (pyrene) | —CH₂CH₂— | — | H | H | 3 | 1 | 1 | 2 | 175 |
| 31 | (pyrene) | —CH₂CH₂— | (phenyl) | H | H | 3 | 1 | 1 | 2 | 40 |
| 32 | (pyrene) | (1,4-cyclohexyl) | — | H | H | 3 | 1 | 1 | 2 | 35 |
| 33 | (pyrene) | (1,2-cyclohexyl) | — | H | H | 3 | 1 | 1 | 2 | 30 |
| 34 | (pyrene) | —CH₂—(cyclohexyl)—CH₂— | (biphenyl) | H | H | 3 | 1 | 1 | 2 | 20 |
| 35 | (pyrene) | —CH₂CH₂— | — | 2-CH₃ | H | 3 | 1 | 1 | 2 | 190 |
| 36 | (pyrene) | —CH₂CH₂— | (phenyl) | 3-CH₃ | H | 3 | 1 | 1 | 2 | 25 |

TABLE 5

| Cpd. | X | Y | Z | R₁ | R₂ | CP. | k | m | n | p |
|------|---|---|---|----|----|-----|---|---|---|---|
| 37 | (pyrene) | (1,4-cyclohexyl) | — | 4-CH₃ | H | 3 | 1 | 1 | 2 | 30 |

TABLE 5-continued

| Cpd. | X | Y | Z | R₁ | R₂ | CP. | k | m | n | p |
|---|---|---|---|---|---|---|---|---|---|---|
| 38 | (pyrene with two methyl groups) | (dimethylcyclohexane) | — | 3-CH₃ | 4-CH₃ | 3 | 1 | 1 | 2 | 30 |
| 39 | (pyrene with two methyl groups) | —CH₂—(cyclohexane)—CH₂— | (biphenyl) | 3-CH₃ | 5-CH₃ | 3 | 1 | 1 | 2 | 25 |
| 40 | (dimethoxy-dimethyl biphenyl) | —CH₂CH₂— | — | H | H | 3 | 1 | 1 | 2 | 175 |
| 41 | (dimethoxy-dimethyl biphenyl) | —CH₂CH₂— | (phenyl) | H | H | 3 | 1 | 1 | 2 | 35 |
| 42 | (dimethoxy-dimethyl biphenyl) | (1,4-cyclohexane) | — | H | H | 3 | 1 | 1 | 2 | 35 |

TABLE 6

| Cpd. | X | Y | Z | R₁ | R₂ | CP. | k | m | n | p |
|---|---|---|---|---|---|---|---|---|---|---|
| 43 | (dimethoxy-dimethyl biphenyl) | (dimethylcyclohexane) | — | H | H | 3 | 1 | 1 | 2 | 30 |
| 44 | (dimethoxy-dimethyl biphenyl) | —CH₂—(cyclohexane)—CH₂— | (biphenyl) | H | 4-CH₃ | 3 | 1 | 1 | 2 | 25 |
| 45 | (9,9-dimethylfluorene with two methyl groups) | —CH₂CH₂— | — | H | H | 3 | 1 | 1 | 2 | 180 |

TABLE 6-continued

| Cpd. | X | Y | Z | R₁ | R₂ | CP. | k | m | n | p |
|---|---|---|---|---|---|---|---|---|---|---|
| 46 | fluorene (CH₃,CH₃) | —CH₂CH₂— | phenyl | H | H | 3 | 1 | 1 | 2 | 30 |
| 47 | fluorene (CH₃,CH₃) | cyclohexyl | — | H | H | 3 | 1 | 1 | 2 | 35 |
| 48 | fluorene (CH₃,CH₃) | cyclohexyl | — | H | H | 3 | 1 | 1 | 2 | 30 |

TABLE 7

| Cpd. | X | Y | Z | R₁ | R₂ | CP. | k | m | n | p |
|---|---|---|---|---|---|---|---|---|---|---|
| 49 | fluorene (CH₃,CH₃) | —CH₂-cyclohexyl-CH₂— | biphenyl | H | H | 3 | 1 | 1 | 2 | 25 |
| 50 | fluorene (CH₃,CH₃) | —CH₂CH₂— | — | 2-CH₃ | H | 3 | 1 | 1 | 2 | 180 |
| 51 | fluorene (CH₃,CH₃) | —CH₂CH₂— | phenyl | 3-CH₃ | H | 3 | 1 | 1 | 2 | 40 |
| 52 | fluorene (CH₃,CH₃) | cyclohexyl | — | 4-CH₃ | H | 3 | 1 | 1 | 2 | 40 |
| 53 | fluorene (CH₃,CH₃) | cyclohexyl | — | 3-CH₃ | 4-CH₃ | 3 | 1 | 1 | 2 | 35 |
| 54 | fluorene (CH₃,CH₃) | —CH₂-cyclohexyl-CH₂— | biphenyl | 3-CH₃ | 5-CH₃ | 3 | 1 | 1 | 2 | 35 |

TABLE 8

| Cpd | X | Y | Z | R₁ | R₂ | CP. | k | m | n | p |
|---|---|---|---|---|---|---|---|---|---|---|
| 55 | 9,9-dimethyl-2,7-dimethylfluorene-diyl | -C₆H₄-C(CH₃)₂-C₆H₄- | — | 3-CH₃ | 5-CH₃ | 3 | 1 | 1 | 2 | 25 |
| 56 | 9,9-dimethyl-2,7-dimethylfluorene-diyl | -C₆H₄-C(CH₃)₂-C₆H₄-C₆H₄-C(CH₃)₂-C₆H₄- | — | 3-CH₃ | 5-CH₃ | 3 | 1 | 1 | 2 | 25 |
| 57 | 3,3',4'-trimethylbiphenyl-4-yl (with 3-CH₃) | —CH₂CH₂— | — | H | 4-CH₃ | 4 | 1 | 1 | 2 | 180 |
| 58 | 3,3',4'-trimethylbiphenyl-4-yl | —CH₂CH₂— | — | 3-CH₃ | 4-CH₃ | 4 | 1 | 1 | 2 | 165 |
| 59 | 3,3',4'-trimethylbiphenyl-4-yl | —CH₂CH₂CH₂— | — | 3-CH₃ | 4-CH₃ | 4 | 1 | 1 | 2 | 160 |
| 60 | 3,3',4'-trimethylbiphenyl-4-yl | —CH₂CH₂— | — | 3-CH₃ | 4-CH₃ | 4 | 1 | 2 | 2 | 145 |

TABLE 9

| Cpd. | X | Y | Z | R₁ | R₂ | CP. | k | m | n | p |
|---|---|---|---|---|---|---|---|---|---|---|
| 61 | 3,3',4'-trimethylbiphenyl-4-yl | —CH₂CH₂— | — | H | 4-CH₃ | 4 | 1 | 1 | 3 | 165 |
| 62 | 3,3',4'-trimethylbiphenyl-4-yl | —CH₂CH₂— | — | 3-CH₃ | 4-CH₃ | 4 | 1 | 1 | 3 | 170 |

TABLE 9-continued

| Cpd. | X | Y | Z | $R_1$ | $R_2$ | CP. | k | m | n | p |
|---|---|---|---|---|---|---|---|---|---|---|
| 63 | 3,4-dimethyl-3'-methylbiphenyl | —CH$_2$CH$_2$— | — | H | 4-OCH$_3$ | 4 | 1 | 1 | 2 | 150 |
| 64 | 3,4-dimethyl-3'-methylbiphenyl | —CH$_2$CH$_2$CH$_2$— | — | H | 4-OCH$_3$ | 4 | 1 | 1 | 2 | 145 |
| 65 | 3,4-dimethyl-3'-methylbiphenyl | —CH$_2$CH$_2$— | — | H | H | 4 | 1 | 1 | 1 | 175 |
| 66 | 3,4-dimethyl-3'-methylbiphenyl | —CH$_2$CH$_2$— | — | H | 4-CH$_3$ | 4 | 1 | 1 | 1 | 40 |

TABLE 10

| Cpd. | X | Y | Z | $R_1$ | $R_2$ | CP. | k | m | n | p |
|---|---|---|---|---|---|---|---|---|---|---|
| 67 | 3,4-dimethyl-3'-methylbiphenyl | —CH$_2$CH$_2$— | — | 3-CH$_3$ | 4-CH$_3$ | 4 | 1 | 1 | 1 | 150 |
| 68 | 3,4-dimethyl-3'-methylbiphenyl | —CH(CH$_3$)CH$_2$— | — | 3-CH$_3$ | 4-CH$_3$ | 4 | 1 | 1 | 2 | 170 |
| 69 | 3,4-dimethyl-3'-methylbiphenyl | —CH$_2$CH$_2$CH$_2$— | — | 3-CH$_3$ | 4-CH$_3$ | 4 | 1 | 1 | 2 | 190 |
| 70 | 3,4-dimethyl-3'-methylbiphenyl | —CH$_2$C(CH$_3$)$_2$CH$_2$— | — | 3-CH$_3$ | 4-CH$_3$ | 4 | 1 | 1 | 2 | 195 |

TABLE 10-continued

| Cpd. | X | Y | Z | $R_1$ | $R_2$ | CP. | k | m | n | p |
|---|---|---|---|---|---|---|---|---|---|---|
| 71 | ⟨○⟩–⟨○⟩–⟨○⟩ | —CH$_2$CH$_2$— | — | H | H | 4 | 1 | 1 | 2 | 165 |
| 72 | ⟨○⟩–⟨○⟩–⟨○⟩ | —CH$_2$CH$_2$— | — | H | 4-CH$_3$ | 4 | 1 | 1 | 2 | 160 |
| 73 | ⟨○⟩–⟨○⟩–⟨○⟩ | —CH$_2$CH$_2$— | — | 3-CH$_3$ | 4-CH$_3$ | 4 | 1 | 1 | 2 | 155 |

The monomer for use in producing the charge transporting polymer can easily be synthesized by the reaction of halogenated carboalkoxyalkylbenzene with aryl amine, diaryl benzidine or the like. Japanese Patent Application Laid-Open (JP-A) No. 05-80550 discloses a process of synthesizing a charge transporting material with an alkylene carboxylate ester group, which includes the steps of introducing a chloromethyl group, then using Mg to form a Grignard reagent, using carbon dioxide to convert the reagent into a carboxylic acid, and then esterifying the carboxylic acid. In this process, however, the chloromethyl group, which is highly reactive, cannot be introduced at the initial stage of the raw material. For example, therefore, the process should include the steps of forming a skeleton of triarylamine or tetraarylbenzidine or the like and then converting the methyl group, which has been introduced at the initial stage of the raw material, into the chloromethyl group or should include the steps of using an unsubstituted compound at the raw material stage and then directly forming the chloromethyl group or should include the steps of introducing a formyl group, reducing it to a hydroxymethyl group, and then using thionyl chloride or the like to convert it into the chloromethyl group. However, the charge transporting material having the skeleton of triarylamine, tetraarylbenzidine or the like is highly reactive and tends to cause a substitution reaction with an aromatic ring. Therefore, it is substantially impossible to convert the introduced methyl group into the chloromethyl group. In the process including the steps of using an unsubstituted compound at the raw material stage and then directly forming the chloromethyl group, the chloromethyl group can only be introduced into para position relative to the nitrogen atom. The process including the steps of introducing the formyl group and then converting it into the chloromethyl group has relatively long reaction steps. In contrast, the process of forming the monomer by the reaction of halogenated carboalkoxyalkylbenzene with aryl amine, diaryl benzidine or the like is outstanding in that the position of the substituent can easily be changed and that ionization potential can easily be controlled. Such a process can control the ionization potential of the charge transporting polymer. Any of various types of substituents can easily be introduced into the charge transporting monomer. The charge transporting monomer is also chemically stable and therefore is easy to handle. Therefore, the above problems can be controlled.

Of these charge transporting polymer materials, the triphenylamine polymer compounds and particularly the benzidine polymer compounds are advantageous in terms of sensitivity or in terms of providing low resistance, because they have low ionization potential, which is closer to the ionization potential of the CGM than that of other materials. The triphenylamine polymer compounds and particularly the benzidine polymer compounds can advantageously have high compatibility with the binder polymer (binder resin) and therefore can hardly cause concentration bias.

The charge transporting layer 34 may contain an auxiliary charge generating material as shown below in combination with the charge transporting material. Applicable examples of the auxiliary charge generating material include a trinitrofluorene compound, a polyvinylcarbazole compound, an oxadiazole compound, a hydrazone compound such as a benzylamino hydrazone compound and a quinoline hydrazone compound, a stilbene compound, a triphenylamine compound, a triphenylmethane compound, and a benzidine compound.

The charge transporting layer 34 having a charge transporting material to polymer binder ratio of 50% by weight or more or comprising the charge transporting macromolecular compound can hardly cause concentration bias of the charge transporting material and therefore can be as thick as 3 to 20 μm, preferably 5 to 10 μm.

The lower charge generating layer 35 on the incident light side is provided to have a lower light absorptance than that of the upper charge generating layer 33 on the other side. In such a structure, the quantity of light absorbed into the lower charge generating layer 35 can be close to that absorbed into the upper charge generating layer 33 under actual driving conditions. Therefore, the charge injection efficiencies of both layers can be close to each other so that the variation in the quantity of the charge flowing under light conditions can be small. Thus, asymmetry of the electrical characteristics can be reduced.

In terms of reducing asymmetry of the electrical characteristics, it is preferred that the upper and lower charge generating layers 33 and 35 are substantially the same under actual driving conditions. In terms of optical sensitivity and resistance value, it is advantageous that the total quantity of light absorbed into the upper and lower charge generating layers 33 and 35 is as large as possible.

Herein, "the quantity of light absorbed into one charge generating layer is close to or substantially the same as that absorbed into the other charge generating layer" does not mean that both charge generating layers have the same light absorptance but means that both charge generating layers absorb the same quantity of light under actual driving conditions.

Ideally, therefore, the lower charge generating layer 33 on the incident light side should have a light absorptance of 50%, and the charge generating layer 35 on the other side should have a light absorptance of 100%. In such a structure, the lower charge generating layer 33 can absorb 50% of the incident light when the light comes into the switching element, and the remaining 50% of the incident light can be transmitted and absorbed into the upper charge generating layer 35 at 100%. The lower and upper charge generating layers 33 and 35 can each absorb 50% of the incident light, and therefore asymmetry can be prevented. Actually, however, it is difficult to achieve the 100% light absorptance of the charge generating layer, and it becomes at about 96 to 98%, therefore the light absorptance should appropriately controlled.

It is preferred that the upper and lower charge generating layers 33 and 35 each absorb substantially the same quantity of light under actual driving conditions as described above. In such a case, the pair of the charge generating layers may preferably be asymmetrical to some extent in such a manner that both layers offer a light absorption ratio (the quantity of light absorbed into the upper charge generating layer 33/that absorbed into the lower charge generating layer 35) of 0.8 to 2.0, preferably 0.8 to 1.5, more preferably 0.9 to 1.2. In such a case, applied voltage waveform distortion can be avoided, and the display characteristics and the driving performance can be improved more effectively.

As used herein, the term "light absorptance" means a ratio of the quantity of light absorbed into the charge generating layer to the quantity of the incident light coming into the optical switching element. If the incident light has a single wavelength, the light absorptance of the charge generating layer can be defined at that wavelength. If the incident light has different wavelengths or a broad spectrum such as that of white light, the light absorptance can be a ratio of the integral of light quantity multiplied by the absorptance of the charge generating layer at respective wavelengths to the integral of incident light quantity at respective wavelengths. The spectrum with respect to the charge generating layer and the spectrum of the incident light quantity can easily be measured using a spectroscope. Based on the spectroscopic result, the light absorption ratio can suitably be designed with respect to the upper and lower charge generating layers.

For example, the light absorptance of the upper and lower charge generating layers 33 and 35 may be adjusted by controlling the mixture ratio of the charge generating material and the binder polymer, which form the charge generating layer. If the mixture ratio of the charge generating material and the binder polymer is constant, the thickness of the charge generating layer may be controlled to produce the same effect. These methods may be used in combination.

Applicable examples of the charge generating material for use in the upper and lower charge generating layers 33 and 35 include metal or nonmetal phthalocyanine, squalium compounds, azulenium compounds, perylene pigments, indigo pigments, azo pigments such as bisazo and trisazo pigments, quinacridone pigments, pyrrolopyrole pigments, polycyclic quinone pigments, condensed ring aromatic pigments such as dibromoanthanthrone, cyanine pigments, xanthene pigments, a charge-transfer complex such as polyvinylcarbazole and nitrofluorene, and a eutectic complex composed of a pyrylium salt dye and a polycarbonate resin. The charge generating material preferably contains any one of the phthalocyanines: chlorogallium phthalocyanine, hydroxygallium phthalocyanine and titanyl phthalocyanine, or any mixture thereof, as a main component.

A particularly preferred crystal structure of the hydroxygallium phthalocyanine has strong diffraction peaks in X-ray diffraction spectrum at Bragg angles (2θ±0.2°) of (i) 7.5°, 9.9°, 12.5°, 16.3°, 18.6°, 25.1°, and 28.3°; (ii) 7.7°, 16.5°, 25.1°, and 26.6°; (iii) 7.9°, 16.5°, 24.4°, and 27.6°; (iv) 7.0°, 7.5°, 10.5°, 11.7°, 12.7°, 17.3°, 18.1°, 24.5°, 26.2°, and 27.1°; (v) 6.8°, 12.8°, 15.8°, and 26.0°; or (vi) 7.4°, 9.9°, 25.0°, 26.2°, and 28.2°. Such a crystal structure can generate charges at high efficiency.

A particularly preferred crystal of the chlorogallium phthalocyanine has strong diffraction peaks in X-ray diffraction spectrum at Bragg angles (2θ±0.2°) of at least 7.4°, 16,6°, 25.5°, and 28.3°; or 6.8°, 17.3°, 23.6° and 26.9°; or 8.7°to 9.2°, 17.6°, 24.0°, 27.4°, and 28.8°. Such a crystal of the chlorogallium phthalocyanine can generate charges at high efficiency. The ionization potential of these materials is about 5.4 eV.

A crystal structure of the titanyl phthalocyanine having diffraction peaks in X-ray diffraction spectrum at Bragg angles (2θ±0.2°) of 9.5°, 9.7°, 11.7°, 15.0°, 23.5°, 24.1°, and 27.3° can generate charges at high efficiency and is therefore particularly preferred.

Examples of the material for the substrate 31 include glass, PET (polyethylene terephthalate), PC (polycarbonate), polyethylene, polystyrene, polyimide, and PES (polyethersulfone). When an organic material is used for the optical switching layer (the charge generating layer and the charge transporting layer), heat treatment at high temperature is not included in the process. In such a case, therefore, a flexible substrate can be used, and an optically transparent plastic substrate is advantageously used in terms of easy molding and cost.

In general, the substrate 31 appropriately has a thickness of from 100 μm to 500 μm.

An ITO film, Au, SnO$_2$, Al, Cu, or the like may be used for the electrode 32.

The substrate 31 and the electrode 32 are not necessarily optically transparent. As disclosed in Japanese Patent Application No. 11-273663, if the display element of the optically addressed type display medium has a memory function and is a backscattering type or a selective reflection type that selectively reflects the wavelengths necessary for display, writing is possible from the display side. In such a case, the substrate 31 and the electrode 32 at least on the display element side have only to be optically transparent. If the optical writing is performed from the display element side, therefore, the substrate 31 or the electrode 32 of the optical switching element 30 does not have to be optically transparent, and for example, an Al layer may be used as the electrode 32.

The optical switching element may comprise any functional layer. For example, a layer for blocking the entry of carriers may be provided between the electrode and the charge generating layer. A reflective film or a light shielding film may also be formed. The functional layer may have two or more of these functions. The functional layer may be used as long as it does not significantly interfere with the current flow.

Devices

Devices utilizing the inventive optical switching element are described below.

The inventive optical switching element may be electrically connected to any functional element to form a device. The optical switching element and the functional element may be connected in series or in parallel or in combination thereof. Any other element may further be connected. As described above, the inventive optical switching element can offer good performance of on/off driving in a range from high to low electric field. Therefore, various functional elements can be applied, and the electrical power consumption can be reduced.

Examples of the functional element include a display element for image display such as a liquid crystal display element, an electrochromic element, an electrophoretic element, and an electrorotation element; a spatial modulator element for any use other than image display; an optical computing element; a memory element for use in any storage device; and an image recording element for use in thermal head. Particularly, the inventive optical switching element is effective for the switching of the image display element, specifically the liquid crystal display element. The liquid crystal display element can be used as an optically addressed liquid crystal spatial modulator element. The inventive optical switching element can effectively be used with the liquid crystal display device, which is basically driven by alternating current. Applicable examples of the liquid crystal include a nematic liquid crystal, a smectic liquid crystal, a discotic liquid crystal, a cholesteric liquid crystal, and the like. The display element with the cholesteric liquid crystal is particularly preferred.

The functional element may have a memory function. Such a functional element may be a liquid crystal display element with a memory function selected from the above liquid crystal display elements. The liquid crystal display element with the memory function is wherein the orientation of the liquid crystal can be maintained for a certain time period even after the application of voltage for controlling the orientation is stopped. Examples of such a liquid crystal include a polymer dispersion type liquid crystal (PDLC), a ferroelectric liquid crystal such as a chiral smectic C phase, a cholesteric liquid crystal, and the like. Such a liquid crystal may be encapsulated for use in the liquid crystal element. The liquid crystal with the memory function does not need electric power to retain the display image. Such a liquid crystal element can be formed in a single device and then can be detached from the main part and independently used. Such a device can be manufactured at low cost.

Examples of the display element with the memory function include the liquid display element as described above, an electrochromic element, an electrophoretic element, and an electrorotation element.

The optical switching element and the functional element connected thereto are preferably integrated into a device. Such integration can stabilize the connection between the optical switching element and the functional element. Integration of the functional element with the memory function and the optical switching element is particularly effective. The device with these elements integrated can be detached from the main part for driving it. For example, the detached device can be distributed. The user can read it at any place in any pose. Of course, only the liquid crystal image display part can be detached for use. However, reconnection between the functional element and the optical switching element may have some difficulty in assuring reliability. Therefore, the integration of the functional element and the optical switching element is more advantageous.

In particular, the inventive device (display medium) effectively comprises the liquid crystal element with the memory function as the functional element and the optical switching element integrated therewith. In particular, a device comprising the cholesteric liquid crystal display element with the memory function and the optical switching element integrated therewith is preferably used for an image display medium, because the cholesteric liquid crystal can have high reflectance and offer good display performance.

According to the invention, the optical switching element, a functional film for eliminating a direct current component, and the functional element are advantageously stacked in order and integrated into a device. In the device comprising the optical switching element and the functional element connected in series, a functional film may be provided between the upper charge generating layer of the optical switching element and the functional element. For example, such a film serves as a separation layer for separating the optical switching element from the functional element.

Optically Addressed Type Display Medium and Display

Figure 2:
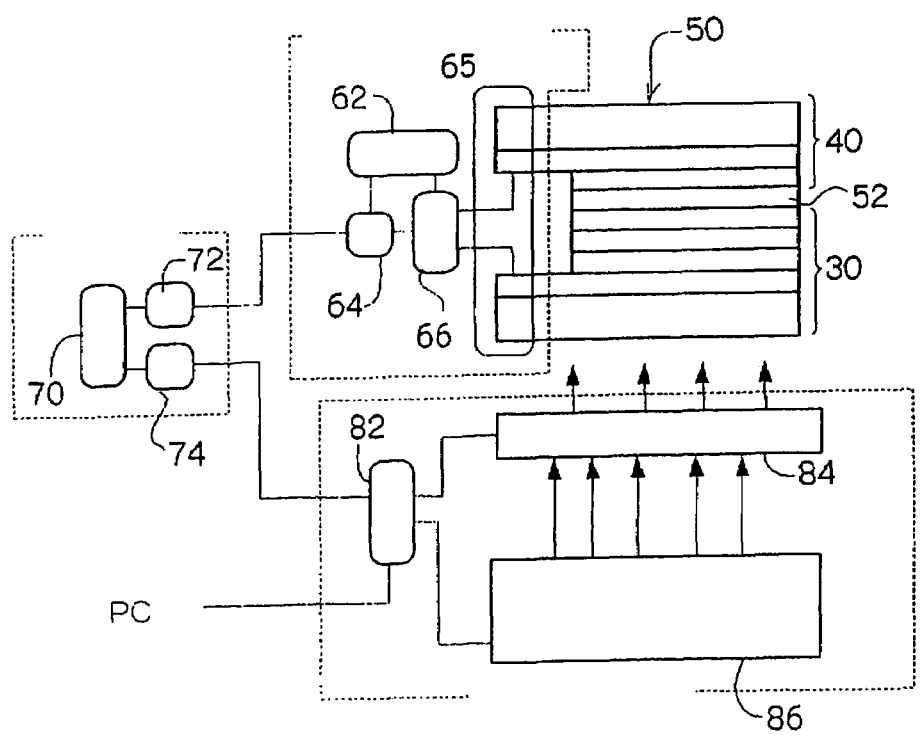
FIG. 2 is a schematic diagram showing a structure of the inventive optically addressed display medium and an image writing device.

An example of the integration of the optical switching element and the functional element is shown below. FIG. 2 specifically shows a system (display) including an image writing unit and an optically addressed type display medium using a cholesteric liquid crystal display element.

The display as shown in FIG. 2 comprises a display medium-driving unit, a writing unit and a control unit for controlling these units. These units may be provided integrally or independently.

The display medium-driving unit comprises waveform generating means 62, input signal detecting means 64, control means 66, and a connector 65. The connector 65 is used for connecting the transparent electrode of the optical switching element-side substrate to the electrode of the display element-side substrate. The connector 65 has a contact on each side. The optically addressed type display medium 50 can freely be detached from the display medium-driving unit.

Figure 3:
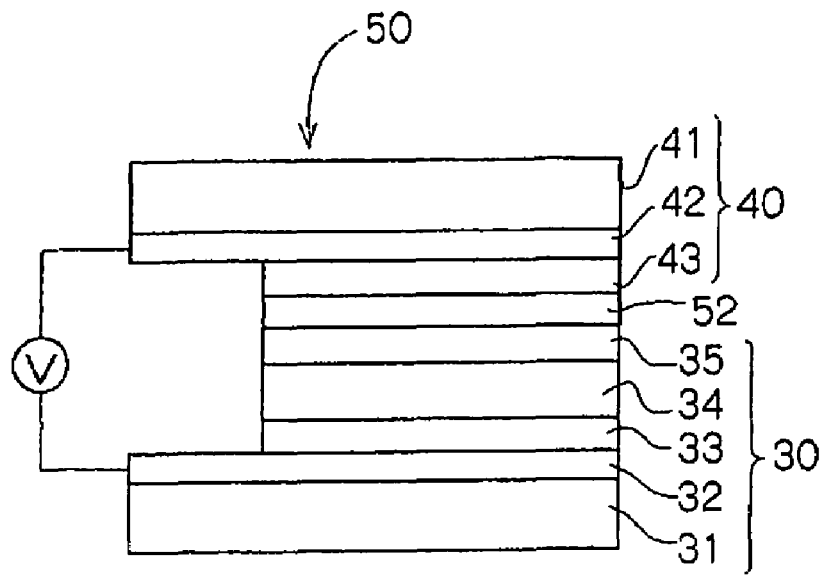
FIG. 3 is a schematic diagram showing a structure of the inventive optically addressed type display medium.

The display medium 50 comprises an optical switching element 30, a display element 40 and a functional film 52 sandwiched between the optical switching element 30 and the display element 40. Referring to FIG. 3, the optical switching element 30 comprises a substrate 31, an electrode 32, a lower charge generating layer 33, a charge transporting layer 34, and an upper charge generating layer 35; and the display element 40 comprises a substrate 41, an electrode 42 and a display layer 43. In the display medium 50, the upper charge generating layer 35 is placed on the display element side. AC electric field is applied between the electrodes 32 and 42. In the display medium 50, the substrate and the electrode of the incident light-side element should be optically transparent depending on whether the optical writing is performed from the optical switching element side or the display element side.

In the display medium 50, for example, the optical switching element 30 has a multilayered switching structure as shown in FIG. 1, which comprises upper and lower charge generating layers 33 and 35 and a charge transporting layer 34 sandwiched between the two charge generating layers 33 and 35.

For example, a cholesteric liquid crystal is used for the display layer 43 of the display element 40. Applicable examples of the cholesteric liquid crystal include a chiral nematic liquid crystal that comprises a nematic liquid crystal such as a steroidal cholesterol derivative, a Schiff base type liquid crystal, an azo type liquid crystal, an ester type liquid crystal, and a biphenyl type liquid crystal, and an optically active group introduced as part of the nematic liquid crystal; and a material that comprises any of the above materials as a chiral agent and a nematic liquid crystal having a positive dielectric anisotropy, such as a Schiff base type, an azo type, an azoxy type, an ethane type, a biphenyl type, a terphenyl type, a cyclohexyl carboxylate ester type, a phenylcyclohexane type, a benzoate ester type, a pyrimidine type, a dioxane type, a tolan type, a cyclohexylcyclohexane ester type, and an alkenyl type, or any liquid crystal mixture thereof.

In the display element 40, the substrate 41 or the electrode 42 may have the same structure as that of the substrate 31 or the electrode 32 in the optical switching element 30.

The writing unit comprises control means 82, patterned light generating means (such as a transmission-type TFT liquid crystal display) 84, and light application means (such as a halogen light source) 86, wherein the control means 82 is connected to PC.

The control unit is used for controlling the display medium driving unit and the writing unit and comprises control means 70, driving wave-generating signal output means 72, and optical writing data output means 74.

Voltage applying means (not shown), which applies driving pulse for display in synchronization with the optical writing by the optical writing means, includes means for generating pulse to be applied and means for detecting the input of trigger before output. The pulse generating means may comprise waveform storing means such as ROM, DA converting means and control means. In such means, the waveform may be read out from the ROM under the application of voltage and then DA-converted and applied to a spatial modulating device. In place of the ROM, an electric circuit system such as a pulse generating circuit may be used for generating the pulse, or any other means for applying driving pulse may be used without limitation.

The writing unit comprises means for generating patterned light, which will be applied to the incident light side of the spatial modulating device; and means for applying the patterned light to the spatial modulating device. The pattern may be produced by a transmission-type display such as a liquid crystal display using TFT and a simple matrix-type liquid crystal display. Any means that can apply light to the spatial modulating device may be used, for example, including a fluorescent light, a halogen lamp and an electroluminescence (EL) light. It will be understood that a luminescence-type display such as an EL display, CRT and a field emission display (FED), which can serve as both of the pattern generating means and the light application means, is also applicable. Alternatively, any other means that can control the quantity, wavelength or application pattern of the light may also be used to apply the light to the spatial modulating device.

In the invention, any method may be used without limitation to drive the functional element. In the driving method, AC voltage, frequency, the quantity of the applied light, and the wavelength may be controlled. The applied voltage should be AC, the waveform of which may be sine, rectangular, triangular, or the like. Of course, any combination thereof or any other waveform may also be used. In order to improve the display performance and the like, a sub-pulse that cannot perform display switching by itself may be added to the driving pulse. Depending on the type of the display element, application of a small bias component may be effective. It will be understood that such a technique may also be used.

Any image can be written to the optically addressed type display medium through the optical writing unit with the configuration as described above. The image once written to the optically addressed type display medium can be retained even when the medium is detached from the connector 65, and the image can be subjected to reading, circulating, distribution, and the like. The written image can be erased or replaced with any other image through a process including the steps of connecting the medium again to the connector 65 and applying a voltage to the medium. Therefore, the optically addressed type display medium can serve the need for resource saving.

EXAMPLES

The present invention is more specifically described with reference to the examples below. However, the examples are not intended to limit the scope of the invention.

Example 1

An optically addressed type display medium having the same structure as shown in FIG. 2 is prepared by the process as shown below.

The lower charge generating layer 33 is formed on an ITO film (800 Å in thickness), which is formed as the electrode layer 32 on a polyethylene terephthalate (PET) substrate 31 (125 μm in thickness). Specifically, the charge generating material used is hydroxygallium phthalocyanine with an ionization potential of 5.31 eV (having strong diffraction peaks in X-ray diffraction spectrum at Bragg angles (2θ±0.2°) of 7.0°, 7.5°, 10.5°, 11.7°, 12.7°, 17.3°, 18.1°, 24.5°, 26.2°, and 27.1°), and the binder resin used is polyvinyl butyral. The charge generating material and the binder resin are mixed in a weight ratio of 1:1 and dispersed in butanol to form a 2% by weight dispersion (Coating Liquid A). The dispersion is applied to the substrate by spin coating and dried to form the charge generating layer 33. The resulting charge generating layer 33 has a light absorptance of 45% at 660 nm.

The charge transporting layer 34 is then formed on the lower charge generating layer 33. Specifically, a charge transporting material, N,N-bis(3,4-dimethylphenyl)bisphenyl-4-amine (CTM A) with an ionization potential of 5.39 eV and a binder resin, polycarbonate{bisphenol-Z, (poly(4,4'-cyclohexylidene diphenylene carbonate))} are mixed in different ratios. Each resulting mixture is dissolved in monochlorobenzene to form a 10% by weight solution (Coating Liquid B). The solution is applied using an applicator (Gap: 100 μm) and dried to form the charge transporting layer 34 with a thickness of 7 μm on the charge generating layer 33.

A coating liquid is prepared so as to have the same composition as that of Coating Liquid A except that the solid content is set at 4% by weight. The coating liquid is applied to the charge transporting layer 34 by spin coating and dried to form the upper charge generating layer 35, which has a light absorptance of 80% at 660 nm.

Thus, the optical switching layer is formed.

An aqueous solution of 3% by weight polyvinyl alcohol is applied by spin coating to the optical switching layer to form a polyvinyl alcohol film, which serves as a separation layer (the functional layer 52).

A light shielding film (the functional layer 52), the display element layer 43 comprising an encapsulated liquid crystal element, the transparent electrode 42, and the transparent substrate 41 are formed on the separation layer as shown below.

A mixture of 74.8 parts by weight of a nematic liquid crystal having a positive dielectric anisotropy (E8 (trade name) manufactured by Merck & Co., Inc.), 21 parts by weight of a chiral agent (CB15 (trade name) manufactured by BHD) and 4.2 parts by weight of a chiral agent (R1011 (trade name) manufactured by Merck & Co., Inc.) is dissolved by heat and then allowed to cool to room temperature, resulting in a chiral nematic liquid crystal that can selectively reflect blue-green light.

To 10 parts by weight of the blue-green chiral nematic liquid crystal are added 3 parts by weight of an adduct of 3 moles of xylene diisocyanate and 1 mole of trimethylol propane (D-110N (trade name) manufactured by Takeda Chemical Industries, Ltd.) and 100 parts by weight of ethyl acetate to form a uniform solution for use as an oil phase Ten parts by weight of polyvinyl alcohol (Poval 217EE (trade name) manufactured by Kuraray Co., Ltd.) is added to 1000 parts by weight of hot ion-exchanged water, stirred and allowed to cool, so that a liquid for use as an aqueous phase is prepared.

In a household mixer energized with 30 V AC through a slidax, 10 parts by weight of the oil phase is dispersed and emulsified in 100 parts by weight of the aqueous phase for 1 minute to form an oil-in-water emulsion, which comprises oil phase particles dispersed in the aqueous phase. The oil-in-water emulsion is stirred for 2 hours while heated in a 60° C. water bath, so that the interfacial polymerization is completed and liquid crystal microcapsules are formed. The resulting liquid crystal microcapsules are measured for average particle diameter by means of a laser particle size distribution meter. The average particle diameter is estimated as about 12 μm.

The resulting liquid crystal microcapsule dispersion is filtered through a stainless steel mesh with a mesh size of 38 μm and then allowed to stand for a day. An opaque white supernatant is then removed from the dispersion, so that a liquid crystal microcapsule slurry with a solid content of about 40% by weight is obtained.

To the resulting slurry is then added a 10% by weight polyvinyl alcohol solution containing polyvinyl alcohol in an amount of ⅔ of the weight of the solid component of the slurry, so that a coating liquid (Coating Liquid C) is prepared.

Coating Liquid C is then applied to the surface of an ITO film (a transparent electrode layer 800 Å in thickness) formed on a PET film (the ITO-covered PET film: High-beam (trade name) manufactured by Toray Co., Ltd.) (a transparent substrate 125 μm in thickness) using a #44 wire bar, so that a liquid crystal-containing display element layer is formed.

The PET film is provided on which the optical switching layer and the separation layer are formed. Black polyimide (BKR-105 (trade name) manufactured by Nippon Kayaku Co., Ltd.) is then applied to the surface of the separation layer to form the light shielding layer (1 μm in thickness). A fully-aqueous dry lamination adhesive (DICDRY WS-321A/LD-55 (trade name) manufactured by Dainippon Ink and Chemicals, Incorporated) is then applied and dried to form an adhesive layer with a thickness of 4 μm. The display element layer formed on the PET film is brought into intimate contact with the adhesive layer and subjected to lamination at 70° C., so that an optically addressed type monochromatic display medium is obtained.

According to the above process, different optically addressed type display media (A-1 to A-4) are produced with different charge transporting material to binder polymer ratios (CTM/(CTM+BP) ratios) as shown in Table 11, and then a comparison is made with respect to asymmetry ratio.

In addition, optically addressed type display media (B-1 to B-5) are produced using the material represented by the structural formula below (CTM B) as the charge transporting material and using different CTM/(CTM+BP) ratios as shown in Table 11, and then a comparison is made with respect to asymmetry ratio.

Figure 4:
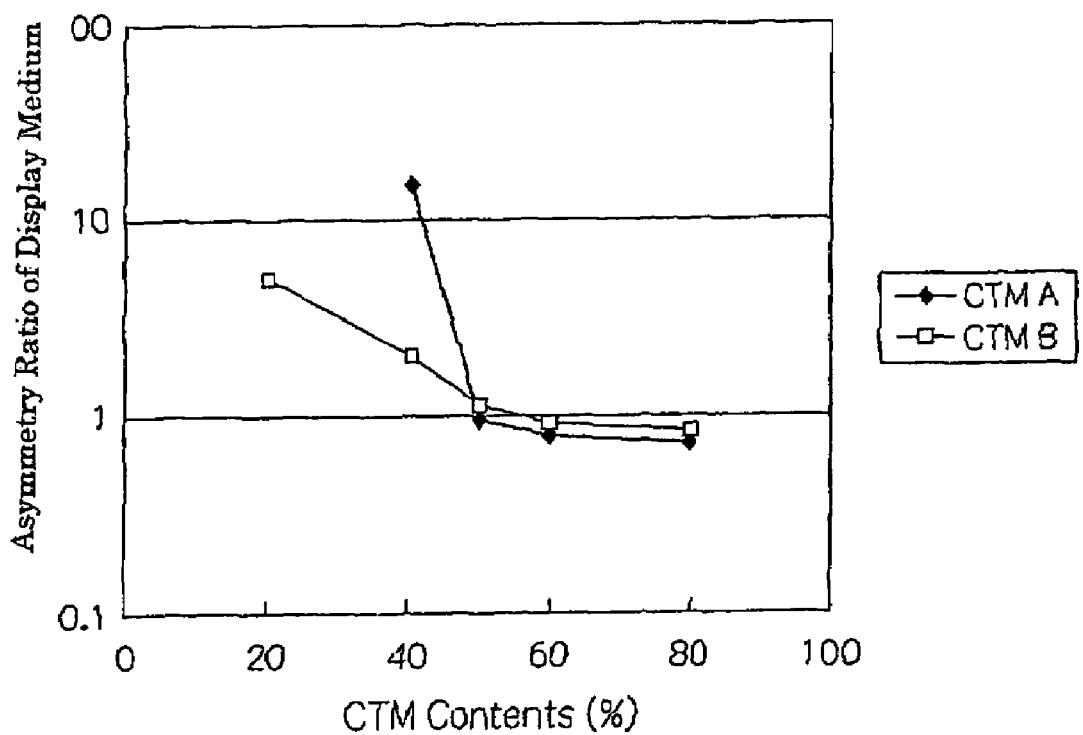
FIG. 4 is a graph showing the relationship between asymmetry ratio of the display medium and CTM content in Example 1.

The results are shown in Table 11 and FIG. 4.

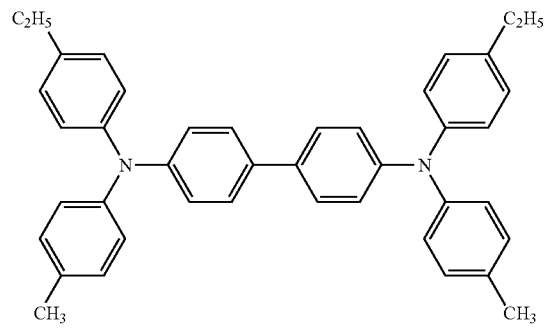

The asymmetry ratio is determined as shown below. A single optical switching element cell is prepared. A specific quantity of light is applied to the cell from an LED light source with a peak at 660 nm, and a ratio between the resistance components in the optical switching element is determined as the asymmetry ratio. Specifically, the resistance components are determined using an impedance analyzer, and a ratio between the resistance components depending on the polarity under bias application is determined as the asymmetry ratio.

TABLE 11

| Medium No. | Change transporting layer | | | |
| --- | --- | --- | --- | --- |
| | Type of CTM | CTM Content (% by weight) | BP Content (% by weight) | CTM/ (CTM + BP) Ratio (% by weight) | Asymmetry Ratio |
| A-1 (Comparative Example) | A | 40 | 60 | 40 | 15.66 |
| A-2 (Example) | A | 50 | 50 | 50 | 1.10 |
| A-3 (Example) | A | 60 | 40 | 60 | 0.88 |
| A-4 (Example) | A | 80 | 20 | 80 | 0.82 |
| B-1 (Comparative Example) | B | 20 | 80 | 20 | 1.74 |
| B-2 (Comparative Example) | B | 40 | 60 | 40 | 1.57 |
| B-3 (Example) | B | 50 | 50 | 50 | 0.97 |
| B-4 (Example) | B | 60 | 40 | 60 | 0.86 |
| B-5 (Example) | B | 80 | 20 | 80 | 0.79 |

Table 11 and FIG. 4 show that if the CTM/(CTM+BP) ratio is 50% by weight or more, the asymmetry ratio can be close to 1, and asymmetry of the electrical characteristics can be reduced. In the Examples, the lower and upper charge generating layers are formed so as to absorb substantially the same quantity of light, and therefore the dual CGL structure of each resulting optical switching element has good symmetry. For example, the lower charge generating layer has a light absorptance of 45%, and the upper charge generating layer 80%, in the Examples. Practically, therefore, the lower layer absorb 45% of the quantity of light, and the upper layer 44%. Thus, good symmetry can be achieved.

Example 2

Display media (C-1 and C-2) are produced according to the process of Example 1, except that some steps are modified as shown below.

Display Medium C-1 (Example of the Invention)

The lower charge generating layer 33 is formed as shown below. The charge generating material used is hydroxygallium phthalocyanine with an ionization potential of 5.31 eV (having strong diffraction peaks in X-ray diffraction spectrum at Bragg angles (2θ±0.2°) of 7.0°, 7.5°, 10.5°, 11.7°, 12.7°, 17.3°, 18.1°, 24.5°, 26.2°, and 27.1°), and the binder resin used is polyvinyl butyral. The charge generating material and the binder resin are mixed in a weight ratio of 1:1 and dispersed in butanol to form a 2% by weight dispersion (Coating Liquid C). The dispersion is applied to the substrate by spin coating and dried to form the charge generating layer 33. The resulting charge generating layer 33 has a light absorptance of 45%.

The charge transporting layer 34 is then formed as shown below A charge transporting material (CTM), N,N-bis(3,4-dimethylphenyl)bisphenyl-4-amine (CTM A) with an ionization potential of 5.39 eV and a binder resin (BP), polycarbonate{bisphenol-Z, (poly(4,4'-cyclohexylidene diphenylene carbonate))} are mixed in an CTM/BP ratio of 60%/40% by weight. The resulting mixture is dissolved in monochlorobenzene to form a 10% by weight solution (Coating Liquid B). The solution is applied using an applicator (Gap: 100 μm) and dried to form the charge transporting layer 34 with a thickness of 7 μm (with a CTM/(CTM+BP) ratio of 60% by weight) on the charge generating layer 33.

A coating liquid is prepared so as to have the same composition as that of Coating Liquid C except that the solid content is set at 4% by weight. The coating liquid is applied to the charge transporting layer 34 by spin coating and dried to form the upper charge generating layer 35, which has a light absorptance of 80% at 660 nm.

Display Medium C-2 (Comparative Example)

The lower charge generating layer 33 is formed as shown below. The charge generating material used is hydroxygallium phthalocyanine with an ionization potential of 5.31 eV (having strong diffraction peaks in X-ray diffraction spectrum at Bragg angles (2θ±0.2°) of 7.0°, 7.5°, 10.5°, 11.7°, 12.7°, 17.3°, 18.1°, 24.5°, 26.2°, and 27.1°) and the binder resin used is polyvinyl butyral. The charge generating material and the binder resin are mixed in a weight ratio of 1:1 and dispersed in butanol to form a 4% by weight dispersion (Coating Liquid C). The dispersion is applied to the substrate by spin coating and dried to form the charge generating layer 33. The resulting charge generating layer 33 has a light absorptance of 80% at 660 nm.

The charge transporting layer 34 is then formed as shown below. A charge transporting material (CTM), N,N-bis(3,4-dimethylphenyl)bisphenyl-4-amine (CTM A) with an ionization potential of 5.39 eV and a binder resin (BP), polycarbonate{bisphenol-Z, (poly(4,4'-cyclohexylidene diphenylene carbonate))} are mixed in an CTM/BP ratio of 40%/60% by weight. The resulting mixture is dissolved in monochlorobenzene to form a 10% by weight solution (Coating Liquid B). The solution is applied by dip coating at a pulling speed of 120 mm/min to form the charge transporting layer 34 with a thickness of 3 μm (with a CTM/(CTM+BP) ratio of 40% by weight) on the charge generating layer 33.

The upper charge generating layer 35 is formed as follows: Coating Liquid C is applied to the charge transporting layer 34 by spin coating and dried to form the upper charge generating layer 35, which has a light absorptance of 80%.

Evaluation

A driving voltage is applied between the electrodes of the resulting display medium C-1 or C-2, and the reflectance is examined. Light is applied from an LED light source with a peak at 660 nm. The quantity of light at the light time (Photo) is set at 500 μW/cm² (660 nm) using an optical power meter. The voltage is changed in the range of 0 to 600 V in a 10 Hz, 2-pulse mode. The driving pulse has a 10 Hz rectangular wave. The first pulse is negative, and the second pulse is positive. The positive pulse is applied to the transparent electrode of the substrate on the incident light side. The reflectance (ref.) at the dark time (Dark) is examined in a similar manner. Variations in reflectance associated with the application of voltage are measured using Xrite. The result is shown in FIGS. 5 and 6.

Figure 5:
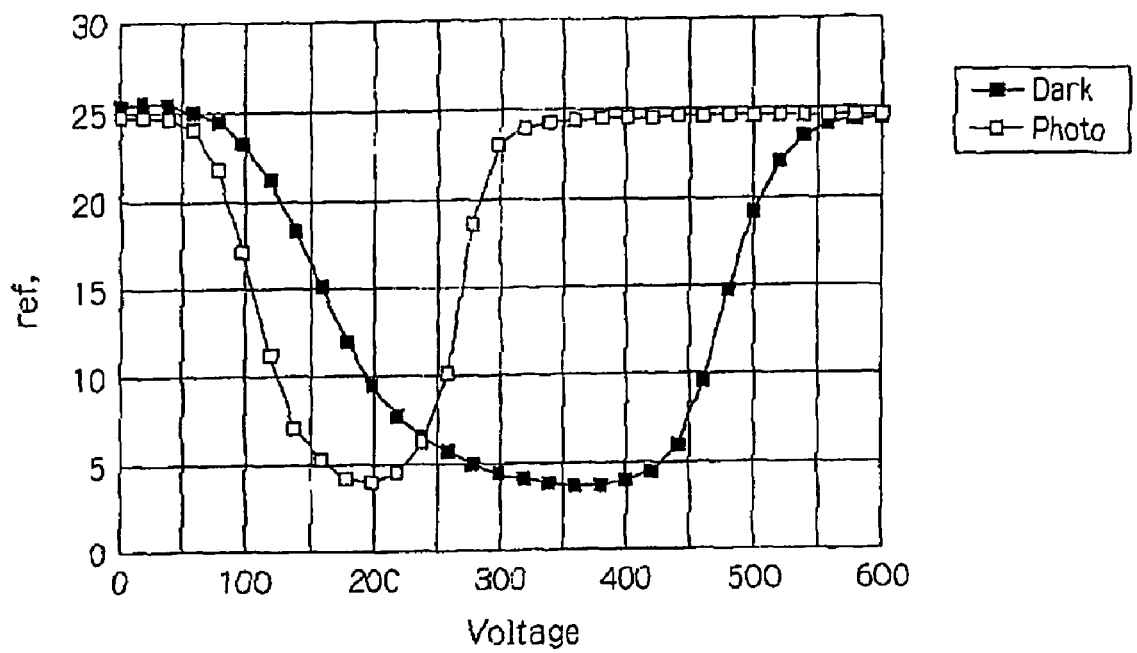
FIG. 5 is a graph showing the reflectance of a display medium (C-1) under the application of voltage in Example 2.
Figure 6:
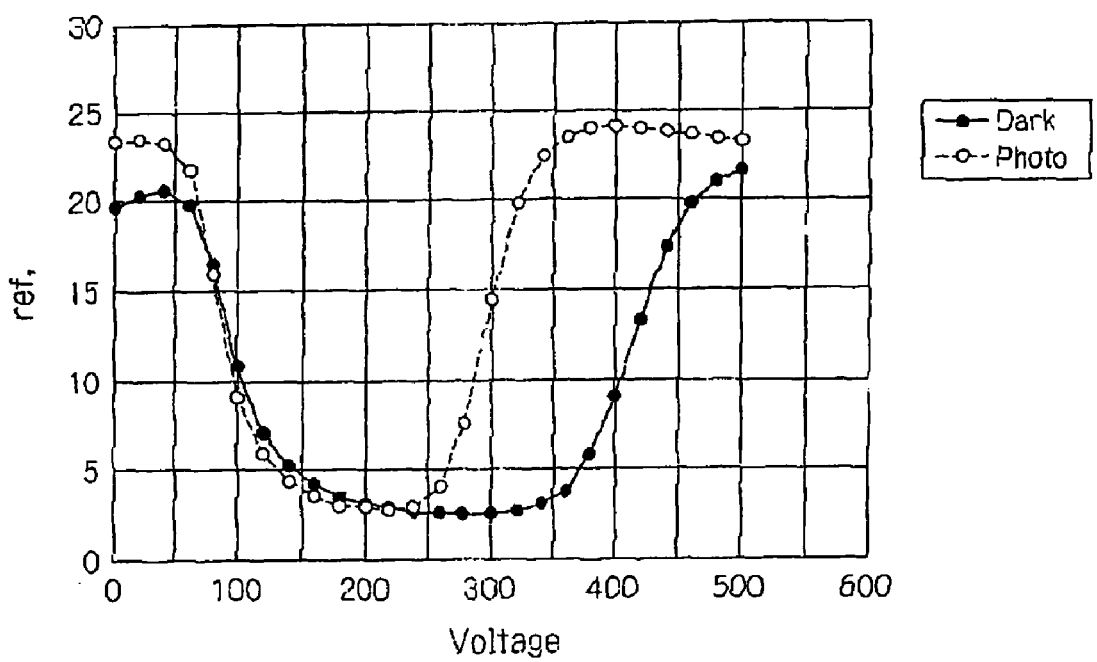
FIG. 6 is a graph showing the reflectance of another display medium (C-2) under the application of voltage in Example 2.

It is apparent from FIG. 5 that the charge transporting layer 34 of the display medium C-1 (Example) with a CTM/(CTM+BP) ratio of 60% by weight can be as thick as 7 μm and that the maximum CR of the display medium C-1 is 10 in contrast to the maximum CR 7.5 of the display medium C-2 (Comparative Example) (see FIG. 6), wherein the maximum CR is the maximum of a light-dark ratio with respect to the reflectance of the display layer at a fixed voltage. It is also apparent that the display medium C-1 has significantly improved display properties.

It is also apparent that in contrast to a driving margin (V50Dark-V50Fhoto) of 120 V in the display medium C-2 (Comparative Example) (see FIG. 6), the display medium C-1 (Example) exhibits a driving margin of 260 V, which is a significantly improved value.

Example 3

A display medium (D-1) is produced according to the process of Example 1, except that some steps are modified as shown below.

Display Medium D-1 (Example of the Invention)

The charge transporting layer 34 is formed as shown below. The charge transporting material used is a charge transporting polymer (Illustrative Compound (58)) synthesized by the process as shown below. The charge transporting polymer is dissolved in monochlorobenzene to form a 10% by weight solution. The solution is applied using an applicator (Gap: 100 μm) and dried to form the charge transporting layer 34 with a thickness of 7 μm on the lower charge generating layer 33.

Synthesis of Charge Transporting Polymer (Illustrative Compound (58))

To a 50 ml flask are added 2.0 g of 3,3'-dimethyl-N,N'-bis(3,4-dimethylphenyl)-N,N'-bis[4-(2-methoxycarbonylethyl)phenyl]-[1,1'-biphenyl]-4,4'-diamine, 4.0 g of ethylene glycol and 0.1 g of tetrabutoxytitanium and heated and refluxed under a stream of nitrogen for 3 hours. After the consumption of 3,3'-dimethyl-N,N'-bis(3,4-dimethylphenyl)-N,N'-bis[4-(2-methoxycarbonylethyl)phenyl]-[1,1'-biphenyl]-4,4'-diamine is checked, the pressure is reduced to 0.5 mmHg. While the ethylene glycol is removed by distillation, the mixture is heated to 230° C. and allowed to react for 3 hours. The mixture is then cooled to room temperature and dissolved in 50 ml of methylene chloride. The insoluble matter is removed by filtration, and the filtrate is added dropwise to 250 ml of ethanol under stirring so that a polymer is precipitated. The resulting polymer is separated by filtration, sufficiently washed with ethanol, and dried to give 1.9 g of the polymer. The molecular weight (Mw) of the polymer is determined, by GPC, as $1.23 \times 10^5$ (in terms of styrene) (polymerization degree (p): about 160).

The asymmetry ratio of the resulting display medium D-1 (Example) is determined by the same way as in Example 1 and found to be 1.2, which is very close to 1 and suggests reduced asymmetry of electrical characteristics.

According to the invention, it is possible to provide an optical switching element having a dual CGL structure in which asymmetry of the electrical characteristics is reduced so that the display characteristics or the driving performance can be improved, and to provide a device, an optically addressed type display medium and a display each using such an optical switching element.

What is claimed is:

1. An optically addressed type display medium comprising: a pair of electrodes, at least one of which has optical transparency; and an optical switching element and a display element, which includes a display layer with a memory function, the optical switching element and the display element being stacked between the pair of electrodes; wherein the optical switching element comprising an optical switching layer that includes a pair of charge generating layers and a charge transporting layer sandwiched therebetween, wherein the optical switching element has at least one of the following characteristics:

(1) the charge transporting layer includes a charge transporting material and a binder polymer, wherein a charge transporting material to binder polymer ratio calculated according to the formula: {charge transporting material/(charge transporting material+binder polymer)}×100 is at least 50% by weight; or (2) the charge transporting layer includes a charge transporting material selected from charge transporting macromolecular materials; or (3) the pair of the charge generating layers include a first charge generating layer on an incident light side of the optical switching layer and a second charge generating layer on the other side of the optical switching layer, wherein the first charge generating layer has a lower light absorptance than that of the second charge generating layer.

2. An optically addressed type display medium according to claim 1, wherein the charge transporting layer includes a charge transporting material and a binder polymer, wherein a charge transporting material to binder polymer ratio calculated according to the formula: {charge transporting material/(charge transporting material+binder polymer)}×100 is at least 50% by weight.

3. An optical switching element according to claim 2, wherein the charge transporting material to binder polymer ratio is at least 60% by weight.

4. An optical switching element according to claim 2, wherein the charge transporting material is selected from benzidine charge transporting materials.

5. A display device comprising: an optically addressed type display medium; means for driving the display medium; and means for performing optical writing to the display medium, wherein the optically addressed type display medium comprises: a pair of electrodes, at least one of which has optical transparency; and an optical switching element and a display element, which includes a display layer with a memory function, the optical switching element and the display element being stacked between the pair of electrodes;

optical switching element comprising an optical switching layer that includes a pair of charge generating layers and a charge transporting layer sandwiched therebetween, wherein the optical switching element has at least one of the following characteristics:

(1) the charge transporting layer includes a charge transporting material and a binder polymer, wherein a charge transporting material to binder polymer ratio calculated according to the formula: {charge transporting material/(charge transporting material+binder polymer)}×100 is at least 50% by weight; or (2) the charge transporting layer includes a charge transporting material selected from charge transporting macromolecular materials; or (3) the pair of the charge generating layers include a first charge generating layer on an incident light side of the optical switching layer and a second charge generating layer on the other side of the optical switching layer, wherein the first charge generating layer has a lower light absorptance than that of the second charge generating layer.

* * * * *